(12) United States Patent
Ozawa

(10) Patent No.: US 8,227,553 B2
(45) Date of Patent: Jul. 24, 2012

(54) RUBBER COMPOSITION FOR GOLF BALL AND GOLF BALL

(75) Inventor: Yuichiro Ozawa, Saitamaken (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 12/836,345

(22) Filed: Jul. 14, 2010

(65) Prior Publication Data

US 2012/0015760 A1 Jan. 19, 2012

(51) Int. Cl.
*A63B 37/06* (2006.01)
*A63B 37/00* (2006.01)
*C08K 5/37* (2006.01)
*C08L 9/00* (2006.01)

(52) U.S. Cl. ........ 525/261; 525/274; 524/392; 473/371; 473/272; 473/377

(58) Field of Classification Search .................. None
See application file for complete search history.

(56) References Cited

U.S. PATENT DOCUMENTS

| | | | |
|---|---|---|---|
| 2,963,434 A * | 12/1960 | Millikan | ........................ 508/567 |
| 6,277,924 B1 | 8/2001 | Hamada et al. | |
| 6,525,141 B2 | 2/2003 | Kataoka | |
| 6,642,314 B2 | 11/2003 | Sone et al. | |
| 7,294,680 B2 | 11/2007 | Sone et al. | |
| 2004/0102580 A1 | 5/2004 | Kataoka et al. | |
| 2005/0187347 A1* | 8/2005 | Sullivan et al. | ............... 525/100 |

FOREIGN PATENT DOCUMENTS

| | | |
|---|---|---|
| JP | 7-268132 A | 10/1995 |
| JP | 11-35633 A | 2/1999 |
| JP | 11-262544 A | 9/1999 |
| JP | 2001-276278 A | 10/2001 |
| JP | 2002-293996 A | 10/2002 |
| JP | 2004-168977 A | 6/2004 |

* cited by examiner

*Primary Examiner* — David Buttner
(74) *Attorney, Agent, or Firm* — Sughrue Mion, PLLC

(57) ABSTRACT

The invention provides a rubber composition for golf balls which includes a base rubber, (B) a metal salt of an unsaturated carboxylic acid and/or an unsaturated carboxylic acid and zinc oxide, (C) an organic peroxide, and (D) from 0.1 to 5 parts by weight of a metal salt of a thiol having the general formula $(R-S)_n M$ (wherein R is a monovalent hydrocarbon group having from 12 to 30 carbons, exclusive of aromatic groups; n is an integer such as 1, 2 or 3; and M is a metal) per 100 parts by weight of the base rubber. The golf ball-forming rubber composition of the invention is suitable for pressure molding and has an excellent productivity because it does not lower the rate of vulcanization. The golf ball of the invention, which is formed using the composition, is endowed with an excellent rebound.

6 Claims, No Drawings

RUBBER COMPOSITION FOR GOLF BALL AND GOLF BALL

BACKGROUND OF THE INVENTION

The present invention relates to a composition from which the solid cores and solid centers (collectively referred to below as "center cores") of solid golf balls and wound golf balls, and also one-piece golf balls, can be efficiently produced and which are capable of conferring a high rebound, and to a golf ball obtained using such a composition and endowed with a high rebound. More particularly, the invention relates to a golf ball-forming rubber composition which is suitable for pressure molding and capable of producing molded parts having an adequate hardness and an excellent initial velocity performance, and to a golf ball produced using such a rubber composition and endowed with a high rebound.

Golf ball-forming rubber compositions have hitherto been used as materials for molding the center cores of solid golf balls and wound golf balls, and for molding one-piece golf balls.

Various improvements have been made to date in golf ball-forming rubber compositions. For example, JP-A 11-262544 discloses a method for producing rubber spheres wherein an organosulfur compound such as a mercapto group-containing benzothiazole or thiadiazole or an aromatic thiophenol (e.g., pentadichlorothiophenol) is blended into a composition containing at least a base rubber and a co-crosslinking agent so as to adjust the rubber composition to a material suitable for injection molding at a slow vulcanization rate.

However, the organosulfur compound in the foregoing disclosure is blended for the purpose of slowing vulcanization so as to give the rubber composition a vulcanization rate suitable for injection molding. Employing such a rubber composition in the pressure molding process customarily used to mold golf ball-forming rubber compositions will therefore increase the vulcanization time, lowering productivity.

To address this problem, JP-A 2001-276278 and corresponding U.S. Pat. No. 6,525,141 disclose the addition of a given amount of specific mercaptans to a rubber composition, making it possible to shorten the vulcanization time and thus improve productivity. Yet, even though the molded products thus obtained have a suitable hardness, the initial velocity remains low and there appears to be room for further improvement.

In addition, U.S. Patent Application No. 2004-102580 (which corresponds to JP-A 2004-168977) discloses art in which an organosulfur compound is added for the purpose of adjusting the trans structure content of the polybutadiene making up the core. However, here too, the initial velocity remains inadequate, leading to a desire for even further improvement.

SUMMARY OF THE INVENTION

An object of the present invention is to provide a golf ball-forming rubber composition which can be advantageously used for pressure-molding center cores for solid golf balls and wound golf balls and for pressure-molding one-piece golf balls, and from which can be obtained molded products of a suitable hardness and improved initial velocity. Another object of the invention is to provide a golf ball which is produced using such a rubber composition and has a high rebound.

The inventors have conducted extensive investigations in order to achieve the above objects. As a result, they have discovered that a golf ball-forming rubber composition which is characterized by including (A) a base rubber, (B) a metal salt of an unsaturated carboxylic acid and/or an unsaturated carboxylic acid and zinc oxide, (C) an organic peroxide, and (D) from 0.1 to 5 parts by weight of a metal salt of a thiol having the general formula $(R-S)_n M$ (wherein R is a monovalent hydrocarbon group having from 12 to 30 carbons, exclusive of aromatic groups; n is an integer such as 1, 2 or 3; and M is a metal) per 100 parts by weight of the base rubber, in spite of including a specific thiol which is an organosulfur compound, does not undergo a decrease in the vulcanization rate and is suitable for pressure molding. The inventors have also found that with the specific thiol indicated above, the rubber composition can be molded under substantially the same molding conditions, enabling molded products imparted with a suitable hardness and an excellent initial velocity performance to be reliably obtained.

On conducting further investigations, the inventors have also discovered that golf balls having a center core produced from the above golf ball-forming rubber composition and one piece golf balls produced from the composition are excellent golf balls endowed with a suitable hardness and a ball structure that provides a high rebound.

Accordingly, the present invention provides the following golf ball-forming rubber composition and golf ball.

[1] A rubber composition for golf balls, comprising (A) a base rubber, (B) a metal salt of an unsaturated carboxylic acid and/or an unsaturated carboxylic acid and zinc oxide, (C) an organic peroxide, and (D) from 0.1 to 5 parts by weight of a metal salt of a thiol having the general formula $(R-S)_n M$ (wherein R is a monovalent hydrocarbon group having from 12 to 30 carbons, exclusive of aromatic groups; n is an integer such as 1, 2 or 3; and M is a metal) per 100 parts by weight of the base rubber.

[2] The rubber composition for golf balls of [1], wherein the metal salt of a thiol is a zinc salt.

[3] A golf ball having a center core and a cover of at least one layer, wherein the center core is formed of the rubber composition for golf balls of [1].

[4] The golf ball of [3], wherein the cover is composed of two or more layers.

[5] A one-piece golf ball formed of the rubber composition for golf balls of [1].

DETAILED DESCRIPTION OF THE INVENTION

The invention is described more fully below.

The inventive rubber composition for golf balls includes as essential components (A) a base rubber, (B) a metal salt of an unsaturated carboxylic acid and/or an unsaturated carboxylic acid and zinc oxide, (C) an organic peroxide, and (D) a metal salt of a specific thiol. It may be advantageously used as any of the following: a one-piece golf ball material, a solid core material or a solid center material.

The base rubber serving as component (A) herein is preferably a polybutadiene which is well-known as a rubber base for golf balls. For example, preferred use may be made of cis-1,4-polybutadiene, and especially cis-1,4-polybutadiene having a cis structure content of at least 40%.

The polybutadiene may be one that has been synthesized using a nickel or cobalt catalyst, or may be one that has been synthesized with a rare-earth catalyst. Polybutadiene synthesized with a rare-earth catalyst is especially preferred. A known rare-earth catalyst may be used for this purpose.

Exemplary rare-earth catalysts include those made up of a combination of a lanthanide series rare-earth compound, an organoaluminum compound, an alumoxane, a halogen-bearing compound and an optional Lewis base.

In the present invention, the use of a neodymium catalyst in which a neodymium compound serves as the lanthanide series rare-earth compound is particularly advantageous because it enables a polybutadiene rubber having a high cis-1,4 bond content and a low 1,2-vinyl bond content to be obtained at an excellent polymerization activity. Preferred examples of such rare-earth catalysts include those mentioned in JP-A 11-35633.

The polymerization of butadiene in the presence of a rare-earth catalyst may be carried out by bulk polymerization or vapor phase polymerization, either with or without the use of a solvent, and at a polymerization temperature in a range of generally from −30 to 150° C., and preferably from 10 to 100° C.

The polybutadiene may be obtained by polymerization using the above-described rare-earth catalyst, followed by the reaction of a terminal modifier with active end groups on the polymer.

Specific examples of the terminal modifier and methods for their reaction are described in, for example, JP-A 11-35633, JP-A 7-268132 and JP-A 2002-293996.

Specific examples of polybutadiene rubbers synthesized with a neodymium catalyst include the JSR Corporation products having the trade name designations BR51 and BR730.

It is essential for the polybutadiene to account for at least 60 wt %, preferably at least 70 wt %, more preferably at least 80 wt %, and most preferably at least 90 wt %, of the rubber base. If the amount of polybutadiene included is too low, obtaining a golf ball endowed with a good rebound will be difficult.

Rubbers other than the above polybutadiene may be used together or blended within a range that does not compromise the objects of the invention. Examples of such other rubbers include polybutadiene rubbers (BR), styrene-butadiene rubbers (SBR), natural rubbers, polyisoprene rubbers, and ethylene-propylene-diene rubbers (EPDM). These may be used individually or as combinations of two or more thereof.

The inventive composition includes, as an essential component, (B) a metal salt of an unsaturated carboxylic acid and/or an unsaturated carboxylic acid and zinc oxide. This component (B) is a component selected for inclusion according to the molded product to be produced from the golf ball-forming composition of the invention. For example, in an embodiment where the golf ball-forming composition of the invention is to be used as a solid center material or a solid core material, a metal salt of an unsaturated carboxylic acid is included as an essential component. In an embodiment where the inventive golf ball-forming composition is to be used as a one-piece golf ball material, an unsaturated carboxylic acid and zinc oxide are included as essential components.

Examples of unsaturated carboxylic acid metal salts that may be preferably included herein are zinc methacrylate and zinc acrylate. The use of zinc acrylate is especially preferred for achieving a high rebound. The amount in which these unsaturated carboxylic acid metal salts are included per 100 parts by weight of the base rubber is preferably at least 10 parts by weight, and more preferably at least 15 parts by weight, but preferably not more than 45 parts by weight, and more preferably not more than 35 parts by weight.

Methacrylic acid, acrylic acid or the like may be advantageously included as the unsaturated carboxylic acid, although the use of methacrylic acid is especially preferred for achieving a high durability. The amount in which these unsaturated carboxylic acids are included per 100 parts by weight of the base rubber is preferably at least 10 parts by weight, and more preferably at least 15 parts by weight, but preferably not more than 45 parts by weight, and more preferably not more than 35 parts by weight.

When including the above unsaturated carboxylic acid, it is essential to include together zinc oxide. The amount of zinc oxide included per 100 parts by weight of the base rubber is preferably at least 5 parts by weight, and especially at least 15 parts by weight, but preferably not more than 45 parts by weight, and especially not more than 30 parts by weight.

The organic peroxide serving as component (C) of the present invention is exemplified by 1,1-di(t-butylperoxy)-cyclohexane, 1,1-bis-t-butylperoxy-3,3,5-trimethylcyclohexane, dicumyl peroxide, di(t-butylperoxy)-m-diisopropylbenzene and 2,5-dimethyl-2,5-di-t-butylperoxyhexane. The amount of organic peroxide included per 100 parts by weight of the base rubber may be set to at least 0.2 part by weight, and especially at least 0.5 part by weight, with an upper limit of not more than 5 parts by weight, and especially not more than 2 parts by weight. A single organic peroxide may be used alone or two or more organic peroxides may be used in admixture.

It is critical for the golf ball-forming rubber composition of the invention to include as component (D) a metal salt of a thiol having the general formula $(R{-}S)_nM$.

Here, R in the general formula represents a monovalent hydrocarbon group having from 12 to 30 carbons, and preferably from 12 to 25, carbons, exclusive of aromatic groups. More specifically, it represents a linear or branched alkyl or alkenyl group.

Here, M in the general formula represents, for example, zinc, magnesium, calcium, sodium or potassium.

The metal salt of a thiol serving as component (D) in the present invention is exemplified by metal salts of dodecanethiol (number of carbons: C12), metal salts of tridecanethiol (C13), metal salts of tetradecanethiol (C14), metal salts of pentadecanethiol (C15), metal salts of hexadecanethiol (C16), metal salts of heptadecanethiol (C17), metal salts of octadecanethiol (C18), metal salts of nonadecanethiol (C19), metal salts of eicosanethiol (C20), metal salts of pentacosanethiol (C25) and metal salts of triacontanethiol (C30). Of these, the use of the zinc salt of dodecanethiol (C12), the zinc salt of hexadecanethiol (C16) or the zinc salt of octadecanethiol (C18) is preferred. From the standpoint of enhancing the core initial velocity increasing effect, the use of the zinc salt of octadecanethiol (C18) is especially preferred.

In the invention, the amount of the above thiols included per 100 parts by weight of the base rubber, although not subject to an particular limitation, is preferably at least 0.1 part by weight, and more preferably at least 0.3 part by weight, but preferably not more than 5 parts by weight, and more preferably not more than 3 parts by weight. By using the thiol within this range, it works together with the above essential components to suppress decreases in the rate of vulcanization and in the hardness of the molded body itself, and moreover imparts to the molded product an excellent initial velocity performance and rebound. When too little thiol is included, an increase in the initial velocity of the molded body is not achieved. On the other hand, when too much thiol is included, the vulcanization rate decreases and the moldability becomes inferior, in addition to which the hardness and rebound of the resulting molded product undergo large declines.

The inventive composition includes, as essential components, the above-described (A) base rubber, (B) metal salt of an unsaturated carboxylic acid and/or an unsaturated carboxylic acid and zinc oxide, (C) organic peroxide, and (D) a metal salt of a specific thiol. In addition, if necessary, it may also include various additives, such as organosulfur compounds, inorganic fillers and antioxidants. Here, in cases where a filler is used, barium sulfate, calcium carbonate or the like may be included. These fillers may be included in an amount within a range of preferably from 5 to 50 parts by weight per 100 parts by weight of the base rubber so as to adjust the specific gravity.

The above-described materials may be mixed in accordance with a conventional method to obtain the golf ball-forming rubber composition of the invention. For example, use may be made of a process in which the various above materials are mixed with a Banbury mixer, kneader or the like.

Also, when the above golf ball-forming rubber composition is rendered into a molded product, production may be carried out by pressure-molding in the same way as in the production of conventional solid cores, one-piece golf balls and center cores. Use may be made of a process wherein the mixed composition is formed into a slug, and the slug is placed in a mold and vulcanized at a temperature of at least 140° C., and preferably at least 150° C., but not more than 180° C., and preferably not more than 165° C., for a period of at least 10 minutes, and preferably at least 15 minutes, but not more than 60 minutes, and preferably not more than 30 minutes. A vulcanization time similar to that used for conventional rubber compositions may be employed for the inventive composition.

Next, the golf ball of the invention is described. No limitation is imposed on the type of golf ball so long as the ball is produced using the golf ball-forming composition of the invention. Illustrative examples of the golf ball include one-piece golf balls produced solely of the inventive golf ball-forming composition, two-piece golf balls and multi-piece golf balls of three or more pieces wherein a cover of at least one layer is formed so as to encase a solid core produced from the inventive golf ball-forming composition, and wound golf balls having a solid center produced from the inventive golf ball-forming composition.

The solid core in the invention has a diameter of is preferably at least 30 mm, and more preferably at least 35 mm, but preferably not more than 42 mm, and more preferably not more than 41 mm. The weight of the core is preferably at least 20 g, and more preferably at least 25 g, but preferably not more than 43 g, and more preferably not more than 41 g.

Solid cores produced with the inventive composition have a very high rebound and, compared with solid cores produced with conventional golf ball-forming rubber compositions, have a high initial velocity even when the deflection is large and the hardness low. The hardness of the solid core, expressed as the deflection of the solid core when subjected to a final load of 1,275 N (130 kgf) from an initial load of 98 N (10 kgf), is not subject to any particular limitation, but is preferably at least 2.0 mm, and more preferably at least 2.5 mm, but preferably not more than 5.5 mm, and more preferably not more than 4.5 mm. At a low deflection, the feel on impact may worsen. On the other hand, at a high deflection, the rebound may decrease.

The solid golf ball of the invention is formed by encasing the above solid core with one or more cover layer. This cover may be formed using a known cover material. Exemplary cover materials include ionomer resins, balata rubber, and polyurethane, polyamide and polyester-type thermoplastic elastomers. These materials may be used singly or as mixtures of two or more thereof. A cover of one or more layer is formed of these materials.

A known cover-forming method may be employed as the method of forming the cover so as to encase the solid core. Exemplary methods include injection molding and compression molding. For example, when injection molding is carried out, a pre-fabricated solid core is placed in a mold, and the cover material is injected over the core in accordance with a conventional method. When compression molding is carried out, the solid core is encased by a pair of half-cups that have been fabricated from a cover material, and the assembly is subjected to applied pressure in a mold. The above method may be generally followed even in cases where the cover is formed of two or more layers.

It is recommended that the cover in the invention have a thickness which is preferably at least 0.5 mm, and more preferably at least 0.7 mm, but preferably not more than 4 mm, and more preferably not more than 2.5 mm. A cover thickness which is small may lower the durability, and a cover layer which is large may lower the rebound.

In embodiments directed at solid golf balls, in addition to the above-described two-piece solid golf ball, the golf ball of the invention may be embodied as a multi-piece golf ball of at least three pieces in which the core and/or cover is composed of two or more layers. Golf balls of such a multilayer structure can also be manufactured by well-known methods using the above-described core materials and cover materials.

In other embodiments wherein the golf ball of the invention is a wound golf ball having a solid center, as with the above-described solid core, the solid center may be produced with the golf ball-forming rubber composition of the invention.

In the present invention, the solid center has a diameter which may be set to preferably at least 25 mm, and more preferably at least 28 mm, but preferably not more than 38 mm, and more preferably not more than 33 mm. The weight may be set to preferably at least 15 g, and more preferably at least 20 g, but preferably not more than 30 g, and more preferably not more than 25 g. When the solid center has a low weight, the distance traveled by the ball may decrease. On the other hand, when the solid center has a high weight, the distance may exceed the limit prescribed in the Rules of Golf.

The solid center has a hardness, expressed as the deflection when subjected to a final load of 1,275 N (130 kgf) from an initial load state of 98 N (10 kgf), which is not subject to any particular limitation, but may be set to preferably at least 1 mm, and more preferably at least 1.5 mm, but preferably not more than 10 mm, and more preferably not more than 6 mm. A small deflection may diminish the feel on impact, and a large deflection may lower the productivity of wound balls.

Any well-known method may be employed to render the solid core into a wound core. For example, a method may be employed wherein a rubber thread made of polyisoprene is wound onto the solid core in a random winding pattern. A cover may be formed over the wound core by employing a material and method similar to those used above to form a cover on a solid golf ball.

In embodiments wherein the golf ball is a one-piece golf ball, production may be carried out by preparing the golf ball-forming rubber composition of the invention and employing a pressure-molding process for molding the composition in a one-piece golf ball mold under the pressure-molding conditions for the composition.

The golf ball of the invention may be formed to a diameter and weight in accordance with the Rules of Golf, typically a diameter of not less than 42.67 mm and not more than 42.75, and a weight of not less than 45.2 g and not more than 45.93 g.

As described above, the golf ball-forming rubber composition of the invention is suitable for pressure molding, has an excellent productivity without a decrease in the vulcanization rate, and is capable of forming molded products having a suitable hardness and a high rebound. The golf ball of the invention is produced with the foregoing composition and has an excellent rebound.

EXAMPLES

Examples of the invention and Comparative Examples are provided below by way of illustration and not by way of limitation.

Examples 1 to 4, Comparative Examples 1 to 6

Rubber materials of the compositions shown in Table 1 were mixed in a kneader and formed into slugs. The slugs were placed in a mold and pressure-molded for 15 minutes at 155° C., giving solid cores having a diameter of 38.7 mm.

The properties of the solid cores were measured as described below. The results are shown in Table 1.

Core Hardness

The deflection of the solid core when subjected to a final load of 1,275 N (130 kgf) from an initial load state of 98 N (10 kgf) was measured at a temperature of 23±1° C. A larger numerical value indicates a greater softness.

Core Initial Velocity

Measured with an initial velocity measuring apparatus of the same type as that of the USGA, the official governing body of golf in the United States.

TABLE 1

| Formulation (pbw) | Example | | | | Comparative Example | | | | | |
|---|---|---|---|---|---|---|---|---|---|---|
| | 1 | 2 | 3 | 4 | 1 | 2 | 3 | 4 | 5 | 6 |
| BR 730 | 100 | 100 | 100 | 100 | 100 | 100 | 100 | 100 | 100 | 100 |
| Zinc oxide | 22 | 22 | 22 | 22 | 22 | 22 | 22 | 22 | 22 | 22 |
| Antioxidant | 0.1 | 0.1 | 0.1 | 0.1 | 0.1 | 0.1 | 0.1 | 0.1 | 0.1 | 0.1 |
| Zinc diacrylate | 30 | 30 | 30 | 30 | 30 | 24 | 30 | 30 | 24 | 24 |
| Zinc didodecanethiol | 1.0 | | | | | | | | | |
| Zinc dioctadecanethiol | | 0.5 | 1.0 | 2.0 | | | | | | |
| Dodecanethiol | | | | | | | 0.5 | | | |
| Octadecanethiol | | | | | | | | 1 | | |
| 1-Octanethiol | | | | | | | | | 1 | |
| Zinc dioctanethiol | | | | | | | | | | 1 |
| Dicumyl peroxide | 0.3 | 0.3 | 0.3 | 0.3 | 0.3 | 0.3 | 0.3 | 0.3 | 0.3 | 0.3 |
| 1,1-Di(t-butylperoxy)-cyclohexane | 0.3 | 0.3 | 0.3 | 0.3 | 0.3 | 0.3 | 0.3 | 0.3 | 0.3 | 0.3 |
| Core hardness (mm) | 3.20 | 3.05 | 3.18 | 3.31 | 3.12 | 4.14 | 2.94 | 3.15 | 4.19 | 4.17 |
| Core initial velocity (m/s) | 78.06 | 78.07 | 78.03 | 78.10 | 77.74 | 77.12 | 77.93 | 77.97 | 77.44 | 77.49 |

Details on the ingredients formulated in the table are given below.

Trade name "BR 730": cis-1,4-Polybutadiene synthesized with a neodymium catalyst (JSR Corporation)

Antioxidant: Produced by Ouchi Shinko Chemical Industry Co., Ltd. under the trade name "Nocrac NS-6"

Zinc didodecanethiol, zinc dioctadecanethiol and zinc dioctanethiol were synthesized by a neutralization reaction between the respective thiols and zinc oxide.

The results in Table 1 show that each of the solid cores produced using the golf ball-forming rubber compositions of the invention could be molded in a vulcanization time that allowed pressure molding to be used, and had a suitable hardness and an excellent initial velocity performance.

By contrast, each of the solid cores in Comparative Examples 1 to 6 had an initial velocity performance which was inferior to those of the solid cores in the examples of the invention.

The invention claimed is:

1. A rubber composition for golf balls, comprising (A) a base rubber, (B) a metal salt of an unsaturated carboxylic acid and/or an unsaturated carboxylic acid and zinc oxide, (C) an organic peroxide, and (D) from 0.1 to 5 parts by weight of a metal salt of a thiol having the general formula $(R-S)_n M$ (wherein R is a monovalent hydrocarbon group having from 12 to 30 carbons, exclusive of aromatic groups; n is an integer of 1, 2 or 3; and M is a metal) per 100 parts by weight of the base rubber.

2. The rubber composition for golf balls of claim 1, wherein the metal salt of a thiol is a zinc salt.

3. A golf ball having a center core and a cover of at least one layer, wherein the center core is formed of the rubber composition for golf balls of claim 1.

4. The golf ball of claim 3, wherein the cover is composed of two or more layers.

5. A one-piece golf ball formed of the rubber composition for golf balls of claim 1.

6. The rubber composition for golf balls of claim 1, wherein the metal salt of a thiol is selected from the group consisting of zinc salt of dodecanethiol (C12), zinc salt of hexadecanethiol (C16) and zinc salt of octadecanethiol (C18).

* * * * *